United States Patent

Kovach

[11] Patent Number: 6,067,873
[45] Date of Patent: May 30, 2000

[54] SHIFTER WITH NOVEL MOUNTING ARRANGEMENT

[76] Inventor: Miklos A. Kovach, Hammerwise 3, D-51647 Gummersbach, Germany

[21] Appl. No.: 09/157,001

[22] Filed: Sep. 18, 1998

[51] Int. Cl.[7] .............................. B60K 20/00; F16C 11/00
[52] U.S. Cl. ........................................... 74/473.3; 403/119
[58] Field of Search ............................ 74/473.3; 403/119, 403/150, 155, 161; 29/453

[56] References Cited

U.S. PATENT DOCUMENTS

| | | |
|---|---|---|
| 5,309,783 | 5/1994 | Doolittle et al. . |
| 5,445,046 | 8/1995 | Kataumi et al. . |
| 5,497,673 | 3/1996 | Kataumi et al. . |
| 5,522,279 | 6/1996 | Kataumi . |
| 5,560,252 | 10/1996 | Nishigai et al. . |
| 5,588,934 | 12/1996 | Osborn et al. . |
| 5,651,293 | 7/1997 | Ebenstein . |
| 5,666,855 | 9/1997 | Ebenstein et al. ...................... 74/473.3 |

FOREIGN PATENT DOCUMENTS 1400967  11/1968  Germany .

*Primary Examiner*—David A. Bucci
*Assistant Examiner*—Colby Hansen
*Attorney, Agent, or Firm*—Price Heneveld Cooper DeWitt and Litton

[57] ABSTRACT

A shifter assembly for a vehicle transmission includes a base with a mounting structure having inwardly facing, opposing pivot-defining apertures defining an axis of rotation, and access channels that extend upwardly and forwardly at about 35 to 40 degrees into the opposing pivot-defining apertures in a direction perpendicular to the axis of rotation when the base is in a vehicle-installed position. A shift lever includes cylindrically-shaped pivot bosses configured to slide along the access channels into operative rotational engagement with the pivot-defining apertures. The pivot bosses and the pivot-defining apertures have diameters that characteristically are about equal to a width of the access channels, such that the shift lever can be assembled to the base by sliding the pivot bosses along the channels snap-lockingly into the pivot-defining apertures. The base and the shift lever have stops, a transmission cable connector, a pawl, and gear-defining notches that are arranged and configured to prevent accidentally moving the pivot bosses of the shift lever out of the pivot-defining apertures, even when an operator urges the shift lever forcibly forwardly into the park gear position, and even when the operator urges the shift lever rearwardly out of park gear position while the pawl is still engaging the notch corresponding to the park gear position.

21 Claims, 4 Drawing Sheets

SHIFTER WITH NOVEL MOUNTING ARRANGEMENT

BACKGROUND OF THE INVENTION

The present invention relates to shifters for vehicle transmissions, and more particularly relates to a shifter having a shift lever that assembles quickly and easily to a shifter base without separate fasteners but that prevents accidental disengagement.

It is important that shifters be relatively easy to assemble and low cost to produce in high volume given the mass production techniques presently used by vehicle manufacturers, and given the highly competitive environment of the industry. However, it is also critical to maintain the reliability, serviceability, long-term functionality, and quality of shifter assemblies, since customers are very sensitive to their performance and operating characteristics. A shifter assembly is disclosed in U.S. Pat. No. 5,666,855 having a shift lever configured to be slidably assembled to a base without the use of separate fasteners. Specifically, the shift lever includes protruding pivot sections (27) with flattened sides (28) that permit assembly along inlets (25) when in an assembly permitting angular position, but that become misaligned when the shift lever is fully assembled to its base and pivoted to an operating position. A problem can occur if the shift lever is pivoted while still positioned in the inlets, because this can cause damage to the shift lever pivot sections and/or the shifter base.

Accordingly, a shifter is desired solving the aforementioned problems and that can be efficiently constructed with a minimum of parts and with a minimum risk of misassembly, but which is secure, reliable, and serviceable.

SUMMARY OF THE INVENTION

The present invention provides a shifter assembly for a vehicle transmission. The shifter assembly includes a base including opposing channels defining a width dimension and having pivot-defining ends which define a pivot axis and that have a diameter about equal to the width dimension of the opposing channels. The shifter assembly also includes a shift lever including a pair of opposing bosses having a diameter about equal to the width dimension and constructed to both slidably engage the opposing channels of the base for assembly and to pivotally engage the ends of the opposing channels for rotation about the pivot axis. Still further, the base includes a resilient structure for holding the shift lever in operative engagement with the pivot-defining ends. The shift lever, when the pivot bosses are operatively engaged with the pivot-defining ends, is rotatably movable along a shift lever path about the axis of rotation.

The resilient structure for holding the shift lever in the pivot-defining depressions can include different structures. In one embodiment of the present invention, the access channels are slightly smaller in width than the diameter of the pivot bosses. The access channels and the adjacent material of the base are formed of an elastically deformable material, so as to allow the pivot bosses to slide therethrough creating a snap connection of the pivot bosses within the pivot-defining depressions, retaining the bosses therein. In another embodiment of the present invention, the access channels are provided with detents, so as to allow the pivot bosses to slide into the pivot-defining depressions creating a snap connection of the pivot bosses within the pivot-defining depressions. In still another aspect of the present invention, the pivot bosses, pivot-defining depressions, and access channels are substantially of the same diameter and width, thus allowing the pivot bosses to slide along the access channels into operative rotational engagement with the pivot-defining depressions. Other strategically located structures on the shifter combine with natural forces on the shift lever during its operation to hold the shift lever in the pivot-defining depressions, such as transmission cable tension on the shift lever, forces resulting from the gear position notches on the base and the notch-engaging pawl on the shift lever, and an abutting stop on the base and stop-engaging surfaces on the shift lever.

A method for assembly of a vehicle shifter according to the invention includes providing a base including opposing pivot-defining apertures that define an axis of rotation, and further includes access channels that extend into the opposing pivot-defining apertures in a direction perpendicular to the axis of rotation. A shift lever includes pivot bosses configured to slide along the access channels into operative rotational engagement with pivot-defining apertures during assembly of the shift lever into the base. Assembling the shift lever to the base is accomplished by sliding the pivot bosses along the access channels and through the inlets into operative engagement with the pivot-defining apertures.

These and other features and advantages of the present invention will be further understood and appreciated by those skilled in the art by reference to the following specification, claims, and appended drawings.

DETAILED DESCRIPTION OF PREFERRED EMBODIMENT

Figure 1:
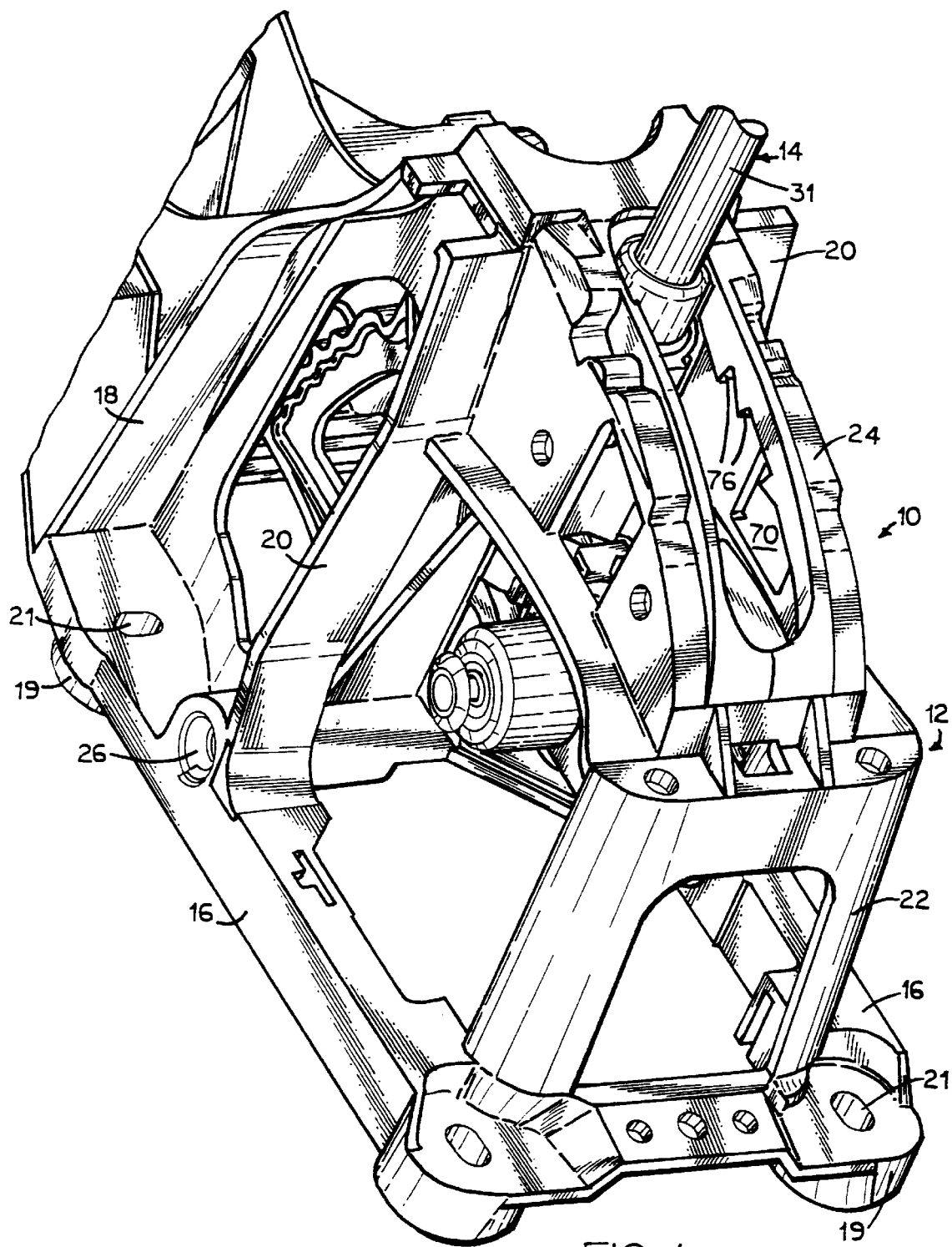
FIG. 1 is a perspective view of a shifter assembly embodying the present invention.

A shifter assembly 10 for vehicle transmissions (FIGS. 1 and 2) includes a base 12 and a shift lever 14. The base 12 is constructed of plastic or other suitable material and includes a lower support 16, forward vertical supports 18, central vertical supports 20, rearward vertical supports 22, or base support and an arcuate shifting platform 24. The base support 16 is provided with inwardly facing, opposing pivot-defining apertures or structures 26 defining an axis of rotation 28, and inwardly facing access channels 30 that extend upwardly and forwardly from a bottom surface 17 of the lower support 16. Specifically, the channels 30 extend at about 35–40 degrees into the opposing pivot-defining apertures 26 in a direction perpendicular to the axis of rotation 28 when the base 12 is in a vehicle-installed position. The lower support 16 is further provided with downwardly projecting mounting posts 19. The mounting posts 19 are provided with centrally located mounting apertures 21 for locating mechanical fasteners (not shown) therein, for securing the shifter assembly 10 to the vehicle.

Figure 2:
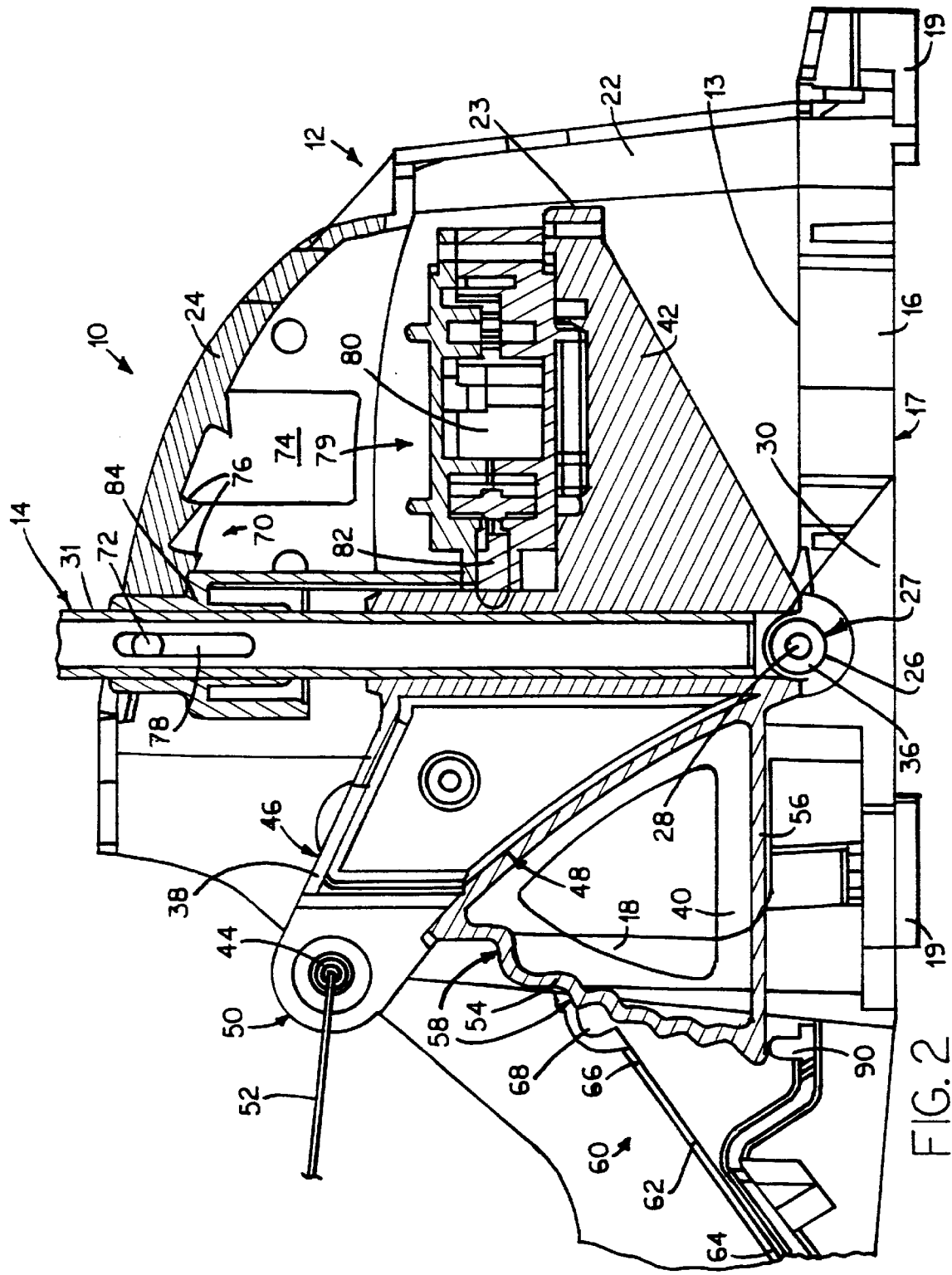
FIG. 2 is a cross-sectional side view of the shifter assembly in FIG. 1.
Figure 3:
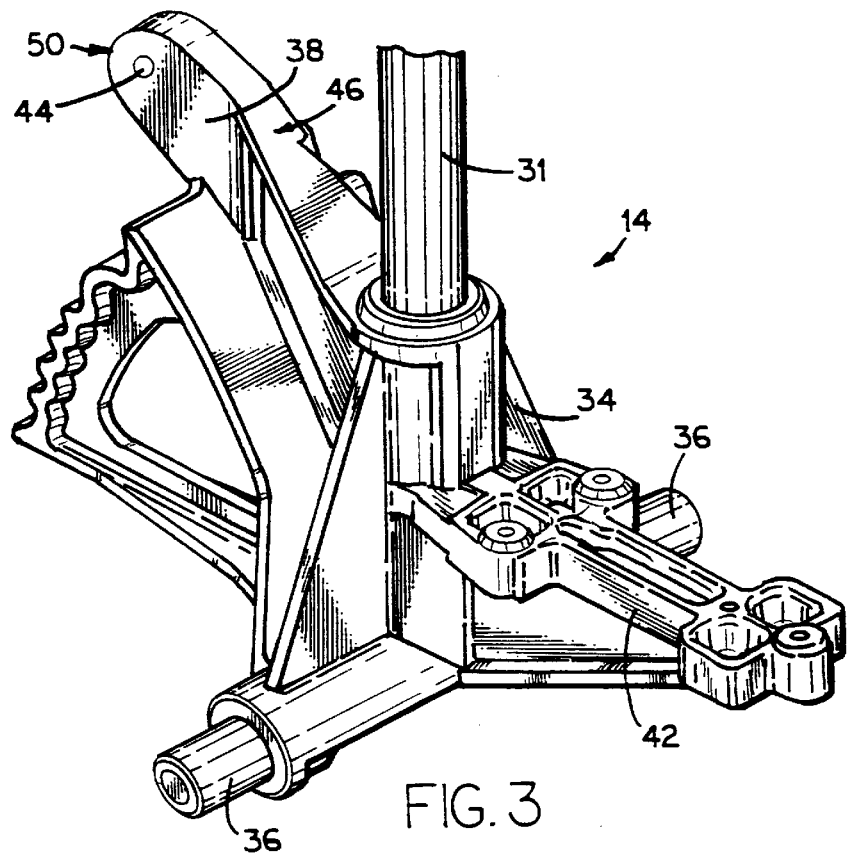
FIG. 3 is a perspective view of the shift lever according to the invention.
Figure 4:
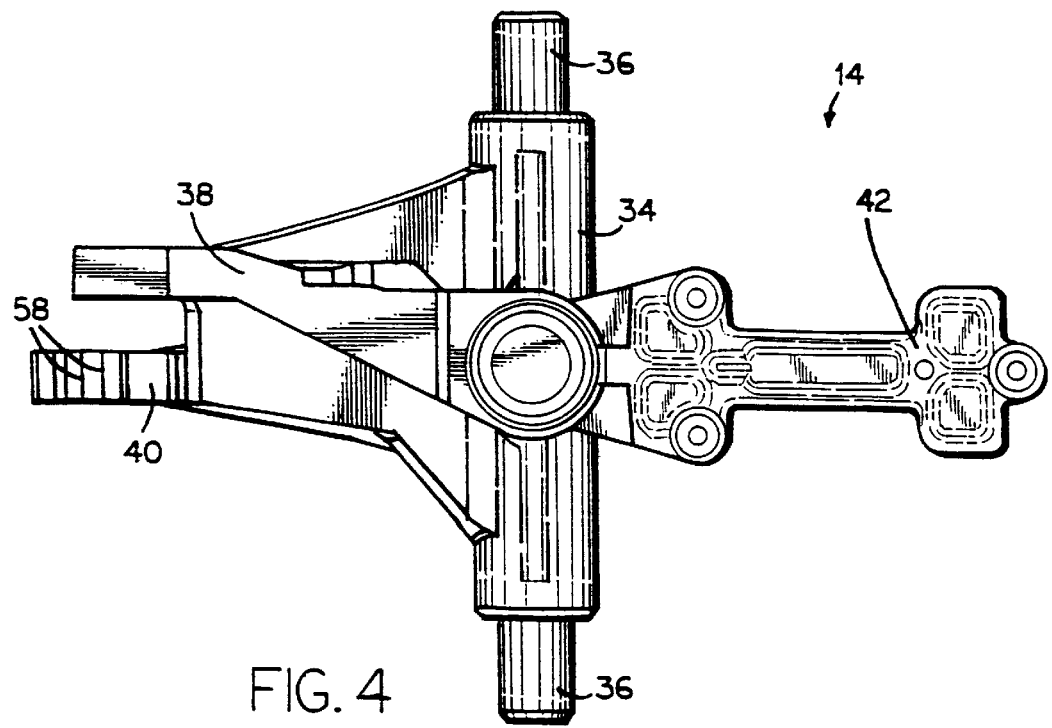
FIG. 4 is a top view of the shift lever in FIG. 3.
Figure 5:
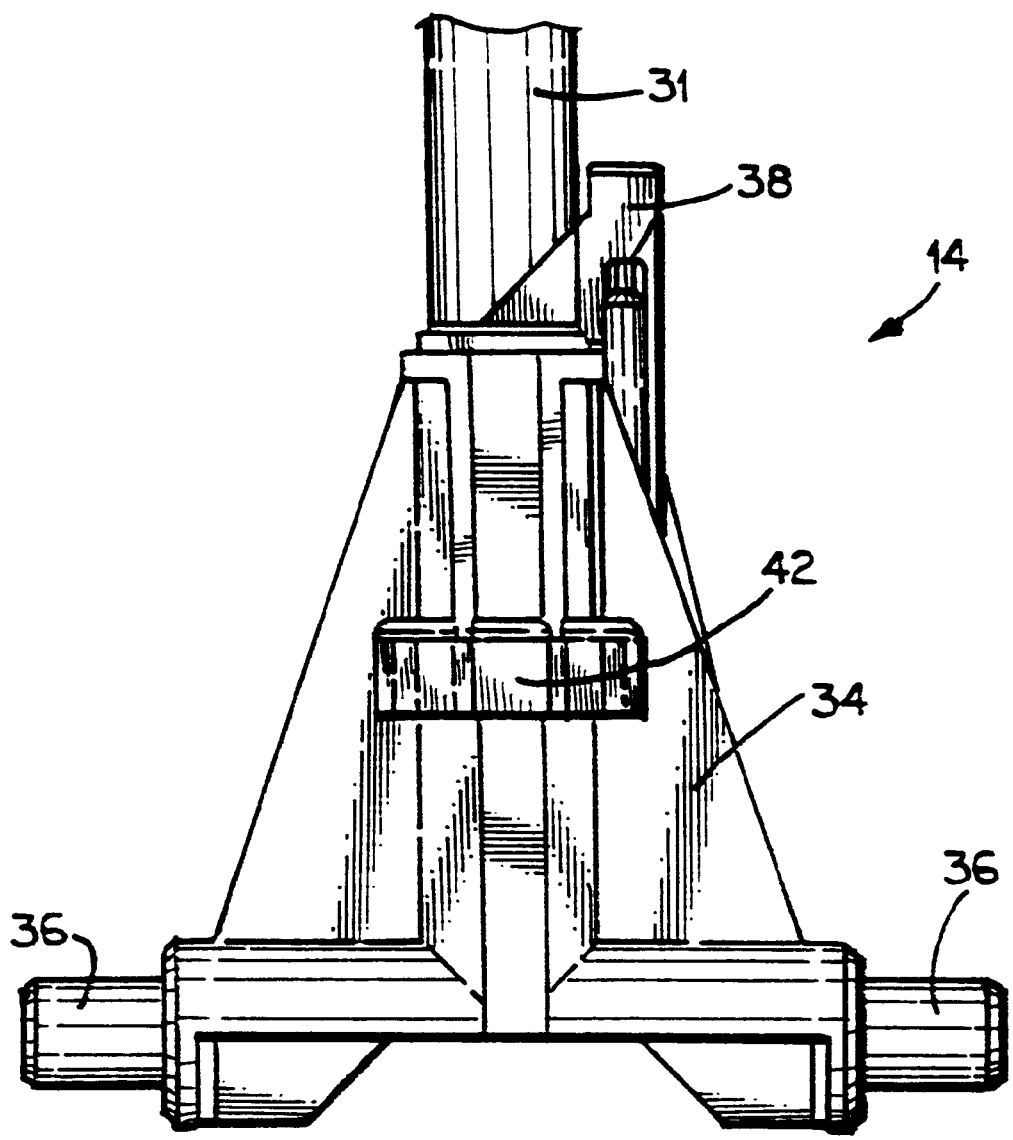
FIG. 5 is a rear view of the shift lever in FIG. 3.

The shift lever 14 (FIGS. 2–5) includes a hollow shift lever post 31, a pair of opposing cylindrically-shaped pivot bosses or structures 36, and a molded body 34. The shift lever post 31 and the pivot bosses 36 are inserted into or molded integrally with the molded body 34 in a perpendicular orientation to the shift lever post 31. Specifically, the shift lever post 31 is inserted into the molded body 34 such that one end of the shift lever post 31 extends outside the molded body sufficient for operator interaction. The pivot bosses 36 are configured to slide along the access channels 30 into operative rotational engagement with the pivot-defining apertures 26. The pivot bosses 36 and the pivot-defining apertures 26 have diameters that characteristically are about equal to the width of the access channels 30, such that the shift lever assembly 14 can be assembled to the base 12 by sliding the pivot bosses 36 along the access channels 30. Notably, the access channels 30 can have a constant width or can have a variable width as shown in FIG. 2 with a necked-down area adjacent the pivot-defining apertures 26. Detents 27 are provided within the access channels 30, such that assemblage of the shift lever 14 with the base 12 results in snap locking the pivot bosses 36 into the pivot-defining apertures 26. While the preferred embodiment incorporates short detents approximately 1 millimeter in depth, detents of any depth or length sufficient to retain the bosses 36 within pivot-defining apertures 26 while allowing the pivot bosses 32 to be slid along access channels 30 and into pivot-defining apertures 26, are acceptable. It is also contemplated that the pivot bosses 36 and the pivot-defining apertures 26 would have diameters that are characteristically slightly larger in width relative to the width of the access channels 30, such that the material of base 12 around channels 30 resiliently flexes during assembly to allow the bosses 36 to be slidingly assembled along access channels 30 into pivot-defining apertures 26.

The shift lever 14 further includes an upwardly sloping, forwardly projecting arm 38 defined by a top wall 46, a bottom wall 48, and a rounded end 50. The forwardly projecting arm 38 is provided with a distally located aperture 44 through which a pin or other mechanical fastener can be inserted to connect a transmission cable 52. The transmission cable 52 provides mechanical communication between the shift lever 14 and the vehicle transmission (not shown). The transmission cable 52 prevents accidental moving of the pivot bosses 36 and of the shift lever 14 out of the pivot-defining apertures 26, even when the vehicle driver urges the shift lever post 31 forcibly forward into the park gear position, and even when the driver urges the shift lever post 31 forcibly rearward out of the park gear position, by providing a reactive force in a substantially opposite direction to the path of the access channels 30 relative to the pivot-defining apertures 26. More specifically, the reactive force biases the bosses 36 against a side of the pivot-defining apertures 26 that is opposite the access channels 30.

The shifter assembly 10 also includes a spring-biased feel positioner mechanism 60. The feel positioner mechanism 60 is comprised of a forwardly projecting section 40 which slopes forwardly downward from the bottom wall 48 of the forwardly projecting arm 38 of the molded body 34. The forwardly projecting section 40 is defined by a forward wall 54 and a bottom wall 56. The forward wall 54 is provided with a plurality of laterally oriented undulations 58. The feel positioner mechanism 60 further includes a biasing spring 62. The biasing spring 62 includes a proximal end 64 and a distal end 66. The proximal end 64 of the biasing spring 62 is affixed to the base frame 12. A roller 68 is rotatably mounted to the distal end 66 of biasing spring 62, such that the roller 68 follows the undulations 58 of the forward wall 54, thereby giving a smooth but detented feel to the operator as he/she shifts between gear positions.

The shifter assembly 10 (FIGS. 1 and 2) further includes a gear selection system 70 including the shifting platform 24 and a pawl 72. The shifting platform 24 includes a detent opening 74 which has gear selection notches 76 displaced therealong for engagement by pawl 72. The shift lever post 31 includes a well-known internal mechanism (not shown) for operating the pawl 72 and need not be described herein for an understanding of the present invention. The shift lever post 31 includes a slot 78 longitudinally oriented within the shift lever post 31, thereby allowing for linear travel of the pawl 72. By moving the pawl 72 out of engagement with the notches 76, the shift lever 14 is shiftable between gear positions park "P," reverse "R," neutral "N," drive "D," second "S," and first "l". The pawl 72 prevents accidental movement of the pivot bosses 36 of the shift lever 14 out of the pivot-defining apertures 26 when the vehicle driver urges the shift lever post 31 forcibly rearward out of the park gear position before disengaging the pawl from the park position by creating a moment arm from the pawl 72 to the pivot bosses 36 that biases the bosses 36 against a side of pivot-defining apertures 26 opposite the access channels 30.

The shifter assembly 10 also includes with a brake-ignition-transmission-shift-interlock system (BITSI) 79, such as disclosed in U.S. Pat. No. 5,211,271, issued to Osborn et al., May 18, 1993. The BITSI system 79 comprises an actuating system 80, such as a magnetic coil, that actuates a locking pin 82 in a linearly reciprocating path. A biasing spring (not shown) urges the locking pin into an extended position. The locking pin engages a locking cylinder 84 slidably positioned about the shift lever 14 and in positive mechanical communication with pawl 72. When in an extended position, the locking pin 82 prevents movement of the locking cylinder 84, thereby preventing movement of the pawl 72 and preventing disengagement of the pawl 72 from within a gear selection notch 76. The actuating system 79 is activated by applying pressure to the braking system of the vehicle, thereby causing the locking pin 82 to retract allowing the pawl 72 to travel and the operator to select a gear setting.

The molded body 34 of the shift lever 14 (FIGS. 2–5) is provided with a rearwardly projecting arm 42, upon which the actuating system 80 of the BITSI system 79 is secured. The rearwardly projecting arm 42 is configured so as to allow sufficient extension of the locking pin 82 into the locking cylinder 84 so as to prevent movement of the pawl 72.

The base 12 is provided with a positive stop 90 projecting upwardly from the lower support 16. The stop 90 is configured, such that it is in substantial contact with the bottom wall 56 of forwardly projecting section 40 when the shift lever post 31 is rotated into the park position. The stop 90 prevents accidental moving of the pivot bosses 36 of the shift lever 14 out of the pivot-defining apertures 26, even when the vehicle driver urges the shift lever post 31 forcibly forward into the park gear position by providing an opposite rotational force to the molded body 34 of the shift lever 14.

In the foregoing description, it will be readily appreciated by those skilled in the art that modifications may be made to the invention without departing from the concepts disclosed herein. It is understood that the embodiments shown in the drawings and described above are merely for illustrative purposes and not intended to limit the scope of the invention, which is defined by the following claims as interpreted according to the principles of patent law, including the doctrine of equivalents.

The invention claimed is:

1. A shifter assembly for a vehicle transmission, comprising:

a base including a first pivot structure that defines an axis of rotation;

a shift lever including a second pivot structure configured to operably engage the first pivot structure, so that the shift lever is rotatable along a shift lever path about the axis of rotation between a park gear position and other gear positions; and one of the first and second pivot structures including pivot-defining apertures and including access channels that extend into the pivot-defining apertures, with the access channels defining a first width dimension that is about equal to a first diameter of the pivot-defining apertures, the other of the first and second pivot structures including pivot bosses attached to the other of the base and the shift lever and configured to slide along the access channels into operative rotational engagement with the pivot-defining apertures during assembly of the shift lever onto the base, the bosses each having a cylindrically-shaped bearing surface characterized by an absence of any large flat surface, the bearing surface defining a second diameter that is about equal to the first diameter of the pivot-defining apertures and that is also about equal to the first width of the access channels.

2. The shifter assembly defined in claim 1 wherein the access channels define an inlet into the pivot-forming apertures, have a second width dimension slightly smaller than the second diameter of the bearing surfaces, and are elastically deformable, so that the pivot bosses snap into and are retained in the pivot-forming apertures.

3. The shifter assembly defined in claim 1 wherein the access channels extend rearwardly and downwardly from the pivot-defining apertures relative to the base when the base is in a vehicle-installed position.

4. The shifter assembly defined in claim 3 wherein the access channels form an acute angle between about 30 degrees to about 60 degrees with respect to a horizontal plane relative to the base when the base is in the vehicle-installed position.

5. The shifter assembly defined in claim 3 wherein the access channels preferably form an acute angle between about 35 degrees to about 40 degrees with respect to a horizontal plane relative to the base being in a vehicle-installed position.

6. The shifter assembly defined in claim 1 wherein the retention of the bosses in the pivot-defining apertures is characterized by an absence of mechanical fasteners securing the bosses in the pivot-defining apertures.

7. The shifter assembly defined in claim 6 wherein the access channels are formed of an elastically deformable material, so as to allow the bosses to slide therethrough creating a snap connection of the bosses within the pivot-defining apertures.

8. The shifter assembly defined in claim 6 wherein radially inwardly extending raised detents are provided at inlets of the channels adjacent the pivot-defining apertures, so as to provide a snapping connection of the bosses within the pivot-defining apertures.

9. The shifter assembly defined in claim 1 wherein the base further includes a detent structure with notches defining a park gear position at one end of the shift lever path and also defining other gear positions along the shift lever path.

10. The shifter assembly defined in claim 9 wherein the shift lever includes a pawl configured to operably engage the notches to control movement of the shift lever along the shift path.

11. The shifter assembly defined in claim 10 wherein the base includes at least one stop that restricts rotation of the lever forward of a forward end of the shift path, the stop being located so that torque caused by an operator trying to force the shift lever forwardly from the park position biases the bosses against a side of the pivot-defining apertures that is in a direction substantially opposite of the access channels.

12. The shifter assembly defined in claim 10 including a spring-biased feel positioner mechanism having a forward section extending from the shift lever, a biasing spring attached to the base, and a roller attached to the biasing spring opposite the attachment of the biasing spring to the base, the forwardly extending section having undulations; the spring being positioned so as to have the roller trace the undulations, such that pivoting of the shift lever provides a detented feel to a vehicle driver when shifting.

13. The shifter assembly defined in claim 10 wherein the shift lever is adapted for attachment to a transmission cable, such that the tension in the transmission cable retains the bosses in the pivot-defining apertures.

14. The shifter assembly defined in claim 13 wherein the shift lever includes a connector adapted for connection with the transmission line and positioned such that tension on the transmission line retains the bosses on the pivot-defining apertures substantially opposite the direction of the access channels.

15. A shifter assembly for a vehicle transmission, comprising:

a base including opposing channels, the opposing channels extending at an acute angle relative to a horizontal plane when the base is held in a vehicle-assembled position, the opposing channels defining a width dimension, the opposing channels having pivot-defining ends which define a pivot axis, the diameter of pivot-defining ends being substantially equal to the width of the opposing channels; and a shift lever including a pair of opposing bosses constructed to slidably engage the opposing channels of the base for assembly and to pivotally engage the pivot-defining ends of the opposing channels for rotation about the pivot axis, the base further including at least one resilient structure for holding the shift lever in operative engagement with the pivot-defining ends, the shift lever being rotatable along a shift lever path about the pivot axis when the pivot bosses are operatively engaged with the pivot-defining ends.

16. The shifter assembly defined in claim 15 wherein the shift lever includes a connector adapted for attachment to a transmission cable and positioned so that when the shift lever is connected to the transmission cable, a natural tension in the transmission cable biases the bosses against a side of the pivot-defining apertures substantially opposite the direction of the access channels.

17. The shifter assembly defined in claim 15 wherein the base includes a stop and the shift lever includes an abutting structure that engages the stop, the stop and abutting structure being positioned so that torque by an operator trying to force the shift lever forwardly from a park gear position biases the bosses against the sides of the pivot-defining depressions that is substantially opposite from the access channels.

18. The shifter assembly defined in claim 17 wherein the base includes a detent structure having notches defining a park gear position at one end of the shift lever path, and also defining other gear positions along the shift lever path, the shift lever including a pawl configured to operably engage the notches to control movement of the shift lever along the shift path, the pawl being located so that torque by an operator trying to force the shift lever rearwardly from a selected gear position biases the bosses against the side of the pivot-defining depressions that is substantially opposite from the access channels.

19. A shifter assembly for vehicle transmissions, comprising:
   a base including opposing channels extending at an acute angle relative to a horizontal plane when the base is held in a vehicle-assembled position, the opposing channels including ends defining a pivot axis;
   a shift lever including a pair of opposing bosses fixed to a bottom of the shift lever and constructed to slidably engage the opposing channels for assembly and to pivotally engage the ends of the opposing channels for rotation about the pivot axis, the bosses having a diameter that is about equal to a width of the opposing channels; and
   the shift lever, when the pivot bosses are operably engaged with the pivot-defining apertures, being rotatably moveable along a shift lever path about the axis of rotation.

20. A shifter assembly for vehicle transmissions, comprising:
   a base including opposing access channels extending at an acute angle relative to a horizontal plane when the base is held in a vehicle-assembled position, the opposing channels including pivot-defining ends defining a pivot axis;
   a shift lever including a pair of opposing bosses attached to a bottom of the shift lever and constructed to slidably engage the opposing channels for assembly and to pivotally engage the ends of the opposing channels for rotation about the pivot axis, the bosses having a diameter that is about equal to a width of the opposing channels;
   the shift lever, when the pivot bosses are operably engaged with the pivot-defining ends, being rotatably moveable along a shift lever path about the axis of rotation;
   the base including a detent structure with notches defining a park gear position at one end of the shift lever path, and also defining other gear positions along the shift lever path;
   the shift lever including a pawl configured to operably engage the notches to control movement of the shift lever along the shift path;
   the shift lever including a connector adapted for attachment to a transmission control cable, the connector being located so that a natural tension on a transmission cable attached to the connector biases the bosses against a closed side of the pivot-defining ends;
   the base and the shift lever including abutting stops that engage when the shift lever is in the park gear position to prevent rotation of the shift lever along the park gear position beyond the park gear position, the stops being located so that torque caused by a driver trying to force the shift lever forwardly from the park gear position biases the bosses against the closed side of the pivot-defining ends which is substantially opposite from the access channels;
   the pawl and the notches being located so that torque caused by the driver trying to force the shift lever rearwardly out of the park gear position when the pawl is engaged with the notch corresponding to the park gear position biases the bosses against the closed side of the pivot-defining end that is substantially opposite from the access channels; and
   whereby the access channels, the stops, the connector, the pawl, and the notches are arranged and configured to prevent accidentally moving the pivot bosses of the shift lever assembly out of the pivot-defining apertures when the driver urges the shift lever forcibly forwardly into the park gear position, and when the driver urges the shift lever forcibly rearwardly out of park gear position even when the pawl is still engaging the notch corresponding to the park gear position.

21. A method of assembling a vehicle shifter comprising steps of:
   providing a base including opposing pivot-defining apertures extending at an acute angle relative to a horizontal plane when the base is held in a vehicle-assembled position and that define an axis of rotation, and further including access channels that extend into the opposing pivot-defining apertures in a direction perpendicular to the axis of rotation;
   providing a shift lever including pivot bosses attached to a bottom of the shift lever and configured to slide along the access channels into operative rotational engagement with the pivot-defining apertures during assembly of the shift lever onto the base, the bosses each having a cylindrically-shaped bearing surface with a first diameter that is about equal to a second diameter of the pivot-defining apertures, and further that is about equal to a first width dimension of the access channels;
   the shift lever, when the pivot bosses are operably engaged with the pivot-defining apertures, being rotatably moveable along a shift lever path about the axis of rotation;
   the access channels defining an inlet into the pivot-defining apertures that has a second width dimension slightly smaller than the first diameter of the bearing surfaces, the access channels being elastically deformable; and
   assembling the shift lever to the base by sliding the pivot bosses along the access channels and forcibly through the inlets into operative engagement with the pivot-defining apertures, so that the pivot bosses snap into and are retained in the pivot-defining apertures during assembly.

* * * * *

UNITED STATES PATENT AND TRADEMARK OFFICE
CERTIFICATE OF CORRECTION

PATENT NO. : 6,067,873
DATED : May 30, 2000
INVENTOR(S) : Miklos A. Kovach

It is certified that error appears in the above-identified patent and that said Letters Patent is hereby corrected as shown below:

On the cover page, please add Assignee as follows:

"Assignee: Grand Haven Stamped Products, Division of JSJ Corporation, Grand Haven, Michigan".

Column 2, line 45;

After "lower support" insert --or base support--.

Column 2, line 47;

Delete "base support" (1st occurrence);

Column 4, line 10;

"S" should be "2".

Signed and Sealed this

Twenty-fourth Day of April, 2001

Attest:

NICHOLAS P. GODICI

Attesting Officer    Acting Director of the United States Patent and Trademark Office